US006139965A

United States Patent [19]

Murai

[11] Patent Number: 6,139,965

[45] Date of Patent: *Oct. 31, 2000

[54] CROSS-GRAINED VENEER AND MANUFACTURING METHOD OF THE SAME

[75] Inventor: Yoshio Murai, Tokyo, Japan

[73] Assignee: Hokusan Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/551,515

[22] Filed: Nov. 1, 1995

[30] Foreign Application Priority Data

Sep. 22, 1995 [JP] Japan .................................... 7-269143

[51] Int. Cl.[7] ...................................................... B32B 21/14

[52] U.S. Cl. .......................... 428/409; 428/511; 428/535; 428/537.1

[58] Field of Search .................................... 428/511, 409, 428/537.1, 535

[56] References Cited

U.S. PATENT DOCUMENTS

| | | | |
|---|---|---|---|
| 4,142,931 | 3/1979 | Viol et al. | 156/257 |
| 4,388,133 | 6/1983 | Hirao | 156/245 |
| 4,465,539 | 8/1984 | Saihara | 156/250 |
| 4,731,145 | 3/1988 | Senzani | 156/264 |
| 4,890,656 | 1/1990 | Ohsumi | 144/350 |
| 5,413,814 | 5/1995 | Bowen | 427/262 |

FOREIGN PATENT DOCUMENTS

| | | |
|---|---|---|
| 50-141798 | 11/1975 | Japan . |
| 6-15612 | 1/1994 | Japan . |

OTHER PUBLICATIONS

Ball, S.J. "Fantasic Finishes" Decorating & Craft Ideas pp. 44–47, Apr. 1982.

*Primary Examiner*—Patricia A. Short
*Attorney, Agent, or Firm*—Oliff & Berridge, PLC

[57] ABSTRACT

Disclosed herein is a new kind of veneer which has the cross grain (such as wavy grain and interlocked grain) artificially formed on the surface of straight-grained veneer cut by quarter sawing from a species of wood which should yield the cross grain but actually has no cross grain. Disclosed also herein is a method of producing the cross-grained veneer, said method comprising cutting wood into veneer of desired thickness which assumes the straight grain, by using a veneer peeling machine equipped with a knife whose cutting edge waves continuously in the lengthwise direction, and flattening the veneer having an uneven surface by means of thermal fixing or hot pressing, thereby artificially forming the cross grain on the surface of the straight-grained veneer. The knife is constructed such that the cutting edge waves in the widthwise direction of the knife and the troughs of the wave are disposed along the straight line extending in the lengthwise direction of the knife.

9 Claims, 11 Drawing Sheets

(5 of 11 Drawing Sheet(s) Filed in Color)

CROSS-GRAINED VENEER AND MANUFACTURING METHOD OF THE SAME

BACKGROUND OF THE INVENTION

1. Field of the Invention

The present invention relates to a new kind of veneer and a method for manufacturing the same. This veneer originally has the straight grain but assumes the cross grain which resembles especially the one technically termed "Chijimi" grain. The present invention relates also to a method of forming the cross grain artificially on the surface of straight-grained veneer.

2. Description of the Prior Art

Veneer is conventionally produced by cutting wood thin (0.2 to 0.5 mm) by using veneer peeling machine, such as slicer and rotary lathe. These machines are provided with a knife to cut wood, which is of such a type that the cutting edge runs straight in the lengthwise direction of the knife. The veneer cut from wood is backed with paper or non-woven fabric and the resulting sheet is used as the surface decorative material for the interior of building, furniture, and vehicles.

Some kinds of wood have a kind of cross grain which is seen on the section of straight grain. (This cross grain is termed "Chijimi" grain in the woodworking industry.) For example, *Aesculus turbinata* BLUME (Japanese horse chestnut) has a kind of interlocked grain called "Tochitorachijimi" grain, and *Swietenia mahagoni* JACQ or *Swietenia macrophylla* KING has a kind of wavy grain called "Gozachijimi" grain. A variety of cross grain is also found in *Fraxinus longicuspis* or *F. mandshurica, Acer saccharun* MARSH., *Larix leptolepis, Khaya sp.* (Acajou), and the like. Since the cross grain mentioned above is found only at a specific part of a specific species of wood, any wood having the designwise fine cross grain is highly regarded because of its scarcity value. However, some kinds of wood which have the cross grain (especially wavy grain and interlocked grain) of good appearance and artistic value are becoming less available than before owing to the recent exhaustion of wood resources. Therefore, cross-grained veneer is highly prized in the market.

SUMMARY OF THE INVENTION

With the foregoing background in mind, the present invention was completed to provide a new kind of veneer which has the cross grain artificially formed on the surface of the straight grain. This veneer is produced from a species of wood which should yield the cross grain but actually has no cross grain. Accordingly, it is an object of the present invention to provide a new kind of veneer having the cross grain and a method for producing the same. It is another object of the present invention to provide a knife for the veneer peeling machine which is indispensable for the production of said veneer having the cross grain. These and other objects of the present invention will become clear from the detailed description and claims which follow and the accompanying drawings.

BRIEF DESCRIPTION OF THE DRAWINGS

The file of this patent contains at least one drawing executed in color. Copies of this patent with color drawing(s) will be provided by the Patent and Trademark Office upon request and payment of the necessary fee.

DESCRIPTION OF THE PREFERRED EMBODIMENTS

Figure 1:
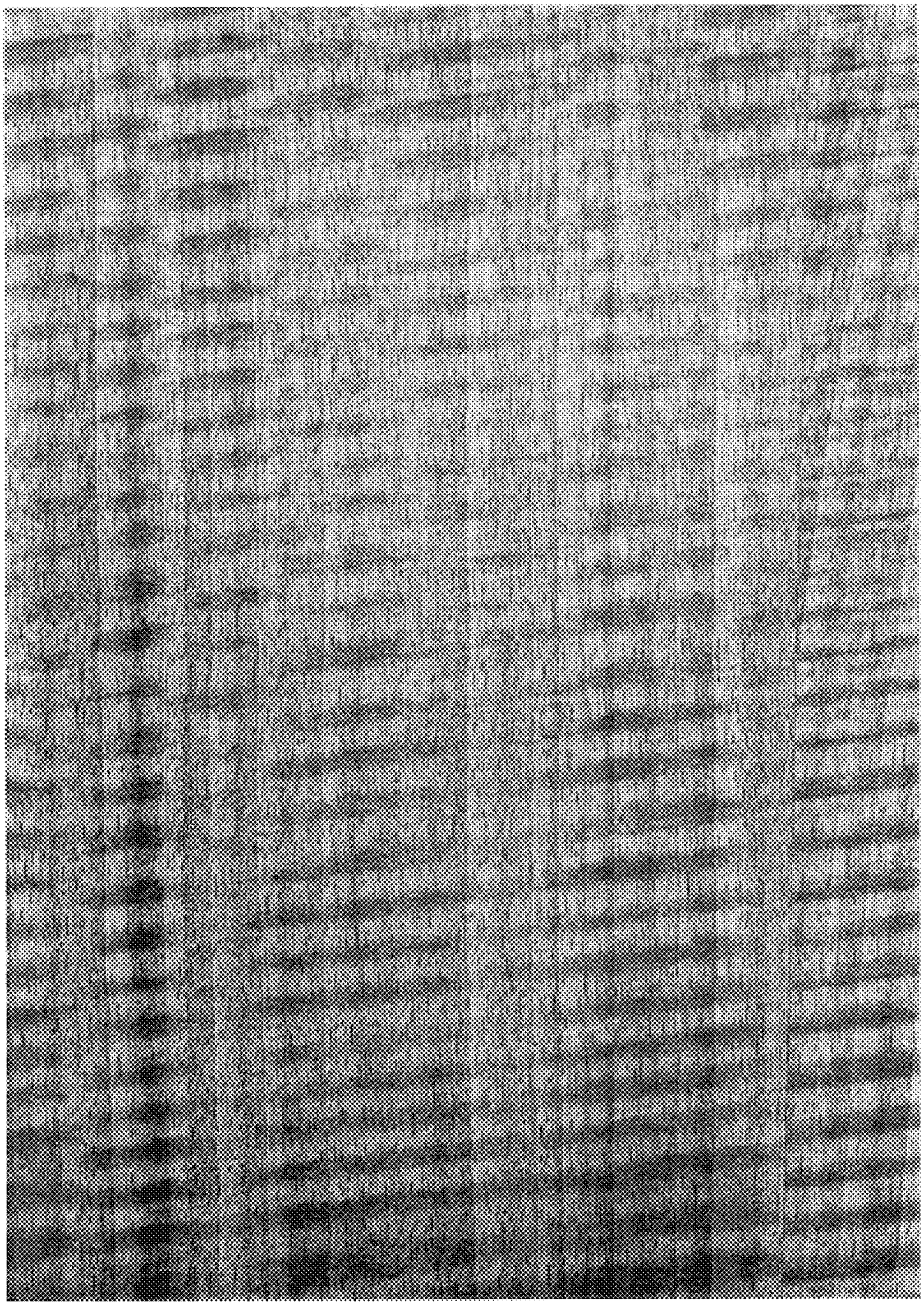
FIG. 1 is a actual-size photograph of the cross-grained veneer obtained in Example 1.

The present inventors carried out a series of researches to address the above-mentioned problem. It was unexpectedly found that with a new method it is possible to artificially form on the surface of straight-grained veneer a kind of cross grain (including wavy grain and interlocked grain) which is termed "Chijimi" grain. This new method consists of cutting veneer of desired thickness (such that it assumes the straight grain) from a flitch using a veneer peeling machine equipped with a knife which has a wavy edge face running in the lengthwise direction, and then flattening the veneer (which has an uneven surface) by means of thermal fixing or hot pressing.

The inventors of the present invention continued their investigation and found that the cross grain can be advantageously formed if the knife for the veneer peeling machine is constructed such that the cutting edge waves in the widthwise direction of the knife and the troughs of the wave are disposed along the straight line extending in the lengthwise direction of the knife. These findings led to the present invention.

The first aspect of the present invention resides in cross-grained veneer characterized in that the cross grain is artificially formed on the surface of straight-grained veneer. The cross grain includes wavy grain, interlocked grain, spiral grain, and diagonal grain.

The second aspect of the present invention resides in a veneer sheet which is composed of said cross-grained veneer and a backing material of fibrous sheet (such as nonwoven fabric) or plastics film (such as polyethylene film).

The third aspect of the present invention resides in a method of producing cross-grained veneer, said method comprising cutting wood into veneer of desired thickness which assumes the straight grain, by using a veneer peeling machine equipped with a knife whose cutting edges waves continuously in the lengthwise direction, and flattening the veneer having an uneven surface by means of thermal fixing or hot pressing, thereby artificially forming the cross grain on the surface of the straight-grained veneer.

The fourth aspect of the present invention resides in a knife to be attached to the veneer peeling machine used to produce said cross-grained veneer. The knife is constructed such that the cutting edge waves in the widthwise direction of the knife and the troughs of the wave are disposed along the straight line extending in the lengthwise direction of the knife.

The knife in the present invention may have the cutting edge modified as follows.

(1) The cutting edge regularly waves such that the height of crests and the distance between crests remain constant.
(2) The cutting edge waves such that the distance between crests remains constant but the height of crests varies.
(3) The cutting edge waves such that the height of crests remains constant but the distance between crests varies.
(4) The cutting edge irregularly waves such that the height of crests and the distance between crests vary.

The cross grain generally denotes any grain which appears when wood cells are arranged in the direction not parallel to the axis of wood. It is contrasted with the straight grain which is parallel to the axis of wood. The cross grain includes diagonal grain, spiral grain (which runs spirally with respect to the axis of wood), interlocked grain (which periodically changes in direction and interlocks with one another), and wavy grain (which assumes a wavy pattern).

There are some kinds of cross grain which are termed "Chijimi" grain in the wood industry and are highly prized because of their artistic appearance. Such cross grain appears on the quartersawn cross section of natural wood such as *Larix leptolepis, Aesculus turbinata* BLUME, *Fraxinus longicuspis, Swietenia mahagoni* JACQ, *Khaya sp.,* and *lauan.* Unlike an ordinary straight grain of each wood, the cross grain "Chijimi" consists of dark-colored part and light-colored part which appear repeatedly one after another, whereby, a shade of pattern (striped pattern) different from an annual ring pattern is obtained by being added to the straight grain and in combination with it.

Figure 13:
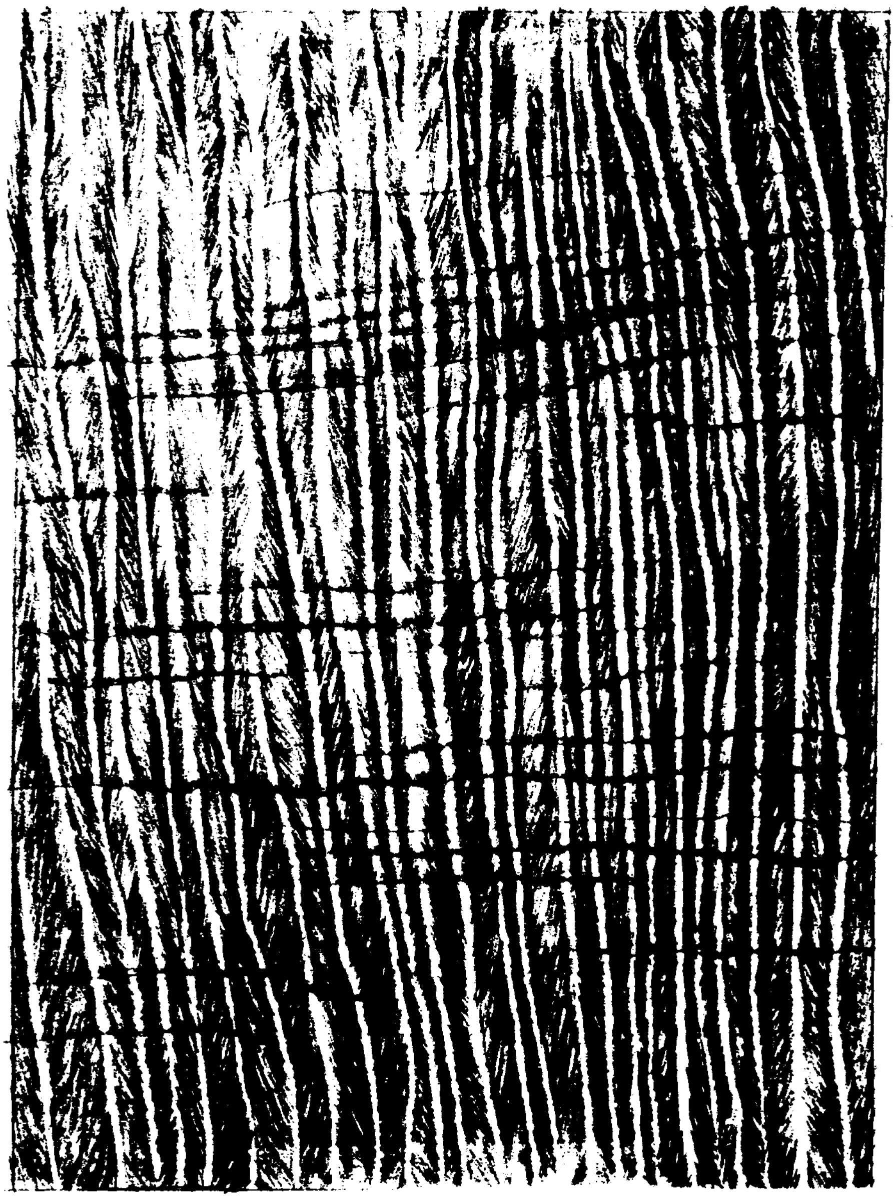
FIG. 13 is a schematic diagram showing the surface of the straight-grained veneer (*Aesculus turbinata* BLUME) having the interlocked grain.

The cross grain of some species of wood may produce a three-dimensional appearance. An example is the cross grain that appears on the straight-grained veneer of *Aesculus turbinata* BLUME, as shown in FIG. 13. (This cross grain is termed "Tochitorachijimi" grain.) The cross grain shown in FIG. 13 looks three-dimensionally as if it were composed of sharp ridges and sharp grooves which are repeatedly formed on the surface of the straight-grained veneer.

Figure 14:
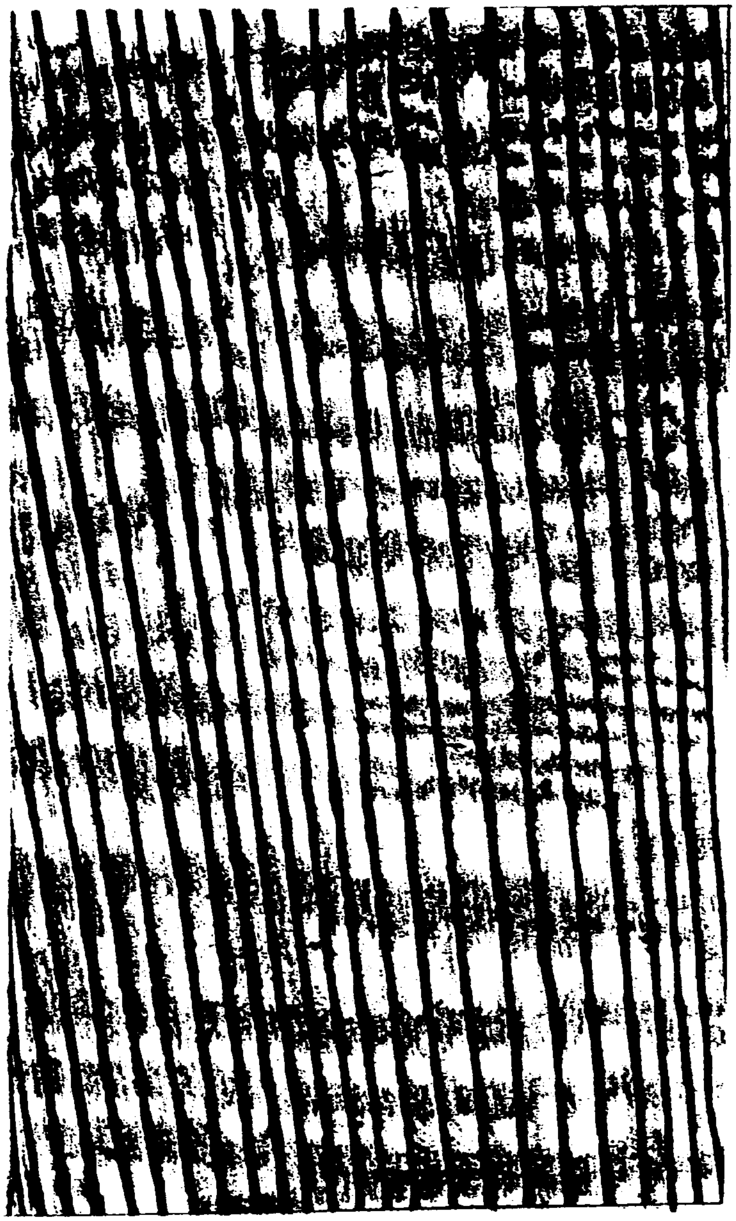
FIG. 14 is a schematic diagram showing the surface of the straight-grained veneer (*Fraxinus longicuspis*) having the wavy grain.

In many cases, the cross grain appears such that the striped pattern changes depending on the angle at which the veneer is viewed. An example is the wavy grain (called "Tamogozachijimi" grain) that appears in the straight-grained veneer of *Fraxinus longicuspis,* as shown in FIG. 14.

The present invention is intended to artificially form the above-mentioned cross grain on the surface of the straight-grained veneer of some species of wood which should yield the cross grain but does not show it in actual.

Incidentally, the term "cross grain" as used in the present invention embraces all kinds of cross grain, such as interlocked grain and wavy grain, which appear in natural wood.

The wood veneer may be veneer of natural wood or veneer of artificial grain. Therefore, the method of the present invention may be applied to logs of natural wood, flitch, and flitch of artificial grain.

The present invention may basically be applied to any species of wood; however, it should preferably be applied to those species of wood which show the cross grain. Such wood may be properly selected from the following examples according to the application of decorative veneer and the taste of consumers.

Domestic wood: *Larix leptolepis, Chamaecyparis obtusa* ENDL., *Quercus crispula* Blume, *Zelkova serrata* MAKINO, *Prunus jamasakura* SIEB. or *Prunus ssiori* FR. SCHMIDT, *Ulmus davidiana* var. *japonica* NAKAI, *Diospyros kaki* THUNB., *Fraxinus longicuspis, Aesculus turbinata* BLUME, *Thujopsis dolabrata, Acer palmatum* THUNB, *Cinnamonum camphora* SIEB., *Cercidiphyllum japonicum* SIEB., *Sophora japomica* LINN., *Phellodendron amurense* Repr. (Amur cork tree), *Pinus thunbergii* Parl, etc.

Imported wood: *Acer pseudoplatanus* L. (sycamore plane), Dalbergia spp., *Tectona grandis* LINN., *Swietenia mahagoni* JACQ, *Khaya sp., lauan, Shorea sp.* or *Parashorea sp., Diosphyros spp.* (*Diospyros marmorata* park.), *Dalbergia stevensonii* Standl., *Mansonia altissima* A. CHEV., *Peterocarpus spp., Micoberlinia brazzavillensis* A. CHEV., *Shorea philippinensis* BRANDIS., *Dalbergia nigra* FR. ALLEM., *Diospyros virginiana* L., *Pterocrpus santalinus* Linn. L., *Cardwellia sublimis* F. MUFELL, *Aningeria robusta* (Silverheart), *Cinnamomum camphora* (*LINN.*) SIEB., *Palaquium spp., Unbellularia californica* NUTT., *Michelia champaca* LINN., *Dracontomelum dao* MERR. Et ROLFE, *Dracontomelum mangiferum* BLUME., *Entandrophragna cylindricum* SPR., *Guibourtia tessmanni* J. LEONARD., *Mimusops heckellii* HUTCH, et DALZ., *Arbutus Menziesii* PURSH., *Acer saccharun* MARSH., *J. california* S. WATS., *Fraxinus americana* L., *Cratoxylon arborescens, Mansonia altissima* A. CHEV., etc.

Preferable among these examples are *Larix leptolepis, Fraxinus longicuspis, Aesculus turbinata* BLUME, *Thujopsis dolabrata, Cinnamonum camphora* SIEB., *Acer pseudoplatanus* L., *Swietenia mahagoni* JACQ, *Khaya sp., lauan, Shorea sp., Cratoxylon arborescens*, which frequently yield the cross grain.

In general, veneer is produced by cutting the flitch of the above-mentioned wood using a veneer peeling machine such as slicer, half rotary, and rotary lathe. The veneer peeling machine is equipped with a knife and the resulting veneer is about 0.2 to 0.5 mm thick. One way of cutting is to produce the veneer which assumes the straight grain on its surface. According to the present invention, such cutting is accomplished by using a knife of special shape which has never existed before.

The conventional knife is made of steel and about 5 to 30 cm wide (from the cutting edge to the back which is fixed to the veneer peeling machine) and about 50 to 500 cm long (in the lengthwise direction in which the cutting edge runs straight), whereas the knife used in the present invention has a cutting edge which continuously waves in the lengthwise direction.

The knife having a wavy edge in the lengthwise direction according to the present invention may cause to generate uneven shear stress at the portion of a flitch and such, which is being cut by a veneer cutting machine using said knife to obtain a straight grain. This uneven shear stress, unlikely in the case of using a conventional knife having a straight edge, is deemed to spread toward the longitudinal direction of the knife. Therefore, the knife of the present invention yields straight-grained veneer which, unlike the conventional straight-grained veneer, has on its surface a striped pattern different from the annual ring pattern. This striped pattern in combination with the straight grain causes the veneer to assume a kind of cross grain.

The knife having a non-straight cutting edge was disclosed in Japanese Patent Laid-Open No. 15612/1994. However, this knife differs from the knife in the present invention in the way in which the cutting edge is formed. In the former case, the cutting edge is composed of concave parts and convex parts which are arranged alternately and continuously in the lengthwise direction. In the latter case, the cutting edge waves in the widthwise direction and the wavy cutting edge runs continuously in the lengthwise direction. Therefore, the known knife does not give the veneer that assumes the cross grain. In addition, the above-mentioned prior art does not propose nor suggest the technique of artificially adding the cross grain. Therefore, it has nothing to do with the present invention.

In the present invention, the shape of the cutting edge is not specifically restricted so long as it is wavy. The shape of wave and the distance between wave crests may be established as desired according to the kind and pattern of the cross grain to be produced. (The cross grain may be the interlocked grain or wavy grain. The pattern may vary in the width of stripes.)

According to the present invention, the cutting edge of the knife is usually formed such that the distance between adjacent crests or troughs is about 2 to 10 mm and the height of wave (distance in the widthwise direction from crest to trough) is about 2 to 15 mm. In general, a cutting edge with a steep wave form is suitable for the interlocked grain, and a cutting edge with a gentle wave form is suitable for the wavy grain.

Although the shape of the cutting edge is not specifically limited as mentioned above, it is necessary that the cutting edge waves in the widthwise direction and the troughs are disposed along the straight line running in the lengthwise direction. This requirement should be met so that the knife gives the veneer that assumes the cross grain which looks as natural as possible.

The following are some examples of the shape of the cutting edge specified in the present invention.

(1) Regular wave form, with the height of crests and the distance between crests remaining constant.

(2) Irregular wave form, with the distance between crests remaining constant but the height of crests varying.

(3) Irregular wave form, with the height of crests remaining constant but the distance between crests varying.

(4) Irregular wave form, with both the height of crests and the distance between crests varying.

For the half rotary, the knife is attached to the knife mount in such a manner than the bias angle is 10° to 20° (usually about 15°). For the slicer, the knife is attached to the knife mount in such a manner that the knife advances diagonally (at about 5° to 40°), instead of straight, with respect to the fixed flitch and slides. Therefore, the knife in the present invention should preferably have the cutting edge inclined in response to the bias angle and/or the locus swept by the moving knife. Incidentally, the flitch should be fixed to the slicer in such a way that it is diagonal (at 20° to 35°, usually about 25°) with respect to the direction in which the knife advances.

According to the present invention, the method for producing the cross-grained veneer consists of two steps. The first step is to cut wood into the veneer of desired thickness which assumes the straight grain, by using the veneer peeling machine equipped with the above-mentioned knife. The second step is to flatten the veneer with uneven surfaces (obtained in the first step) by thermal fixing or hot pressing.

The thermal fixing may be accomplished by using hot rolls at about 100 to 150° C. under a pressure of about 5 to 10 kg/cm$^2$. For thermal fixing, the veneer may be passed through one pair of rolls once or through more than one pair of rolls (as in calendering) several times. The hot pressing may be accomplished by using a hot press at about 100 to 150° C. for about 1 to 2 minutes under a pressure of about 5 to 10 kg/cm$^2$.

The cross-grained veneer produced according to the present invention may be used as such; but it may also be used in the form of laminate after backing with a fibrous sheet (such as paper and nonwoven fabric) or a plastics sheet.

Examples of the paper include Washi (Japanese paper), wood free paper, semi-wood paper, board paper, kraft paper, and resin-impregnated paper. Examples of the nonwoven fabric include those made of raw material fibers of rayon, nylon, polyester, acryl, polyethylene, polypropylene, vinylon, or cupra pulps. Examples of the plastics film include those made of chain polyolefin such as polyethylene, polypropylene, cyclic polyolefin, acrylic resin, or polyvinyl chloride (including copolymers thereof).

The veneer in the form of laminate is also covered by the present invention.

The cross-grained veneer of the present invention may be used as the surfacing material for the laminate exemplified below.

Laminate composed of veneer, paper or nonwoven fabric, plastics film, and paper or nonwoven fabric.

(The constituents of the laminate, paper and nonwoven fabric are as explained above.)

Laminate composed of veneer, paper or nonwoven fabric, plastics film, metal foil, plastics film, and paper or nonwoven fabric.

(The metal foil may be iron foil, aluminum foil, or stainless steel foil. The constituents of the laminate, paper and nonwoven fabric are as explained above.)

The cross-grained veneer of the present invention or a laminate thereof may be bonded to a variety of substrate (listed below) to form wood-based products.

Flexible thick fibrous sheet.

The fibrous sheet should preferably be one which has cushioning properties. It may be selected from Washi (Japanese paper), board paper, woven fabric, and nonwoven fabric.

Foamed plastics sheet.

Examples include foamed polyurethane and foamed polystyrene, with the latter being preferable.

Plywood (of three or five layers).

Medium density fiber board.

This is not specifically restricted in fiber type or density.

Inorganic board.

Examples include gypsum board, calcium silicate board, fiber-incorporated calcium silicate board, fiber-incorporated gypsum board, foamed board of phenolic resin incorporated with glass fiber, foamed board of phenolic resin incorporated with aluminum hydroxide, and foamed concrete.

Glass plate.

This substrate is desirable because of its flat surface.

Plastics plate.

Examples include those of melamine resin, ABS resin, polyurethane resin, epoxy resin, and acrylic resin. Similar substrates may be formed from wood by impregnation with epoxy resin.

The cross-grained veneer and laminate thereof and the wood-based product surfaced therewith are useful as new decorative materials. They may find use as the surfacing material for the interior (e.g., ceiling, wall, and floor) of wood buildings and concrete buildings and also for furniture, household appliances (e.g., television cabinet), and office equipment. They may be used to surface automotive instrument panels and musical instruments (such as guitar and piano).

The present invention will be more clearly understood with reference to the following examples.

EXAMPLE 1

This example demonstrates the veneer (0.3 mm thick) cut from *Aningeria robusta* (Silverheart). It assumes the artificially formed wavy grain (termed "Gozachijimi" grain) as photographically shown in FIG. 1. The flitch from which the veneer was cut assumes the straight grain as photographically shown in FIG. 2. It is noted from FIGS. 1 and 2 that the grain of this veneer is a combination of the original straight grain and the artificially formed wavy grain.

EXAMPLE 2

This example demonstrates the veneer (0.3 mm thick) cut from *Entandrophragna cylindricum* SPR. It assumes the artificially formed wavy grain as photographically shown in FIG. 3. The flitch from which the veneer was cut assumes the straight grain as photographically shown in FIG. 4. It is noted from FIGS. 3 and 4 that the grain of this veneer is a combination of the original straight grain and the artificially formed wavy grain.

EXAMPLE 3

This example demonstrates the veneer (0.3 mm thick) cut from *Acer pseudoplatanus* L. It assumes the artificially formed interlocked grain as photographically shown in FIG. 5. It is noted from FIG. 5 that the grain of this veneer is a combination of the original straight grain and the artificially formed interlocked grain.

EXAMPLE 4

This example demonstrates the method of producing the cross-grained veneer shown in Examples 1 to 3.

Figure 6:
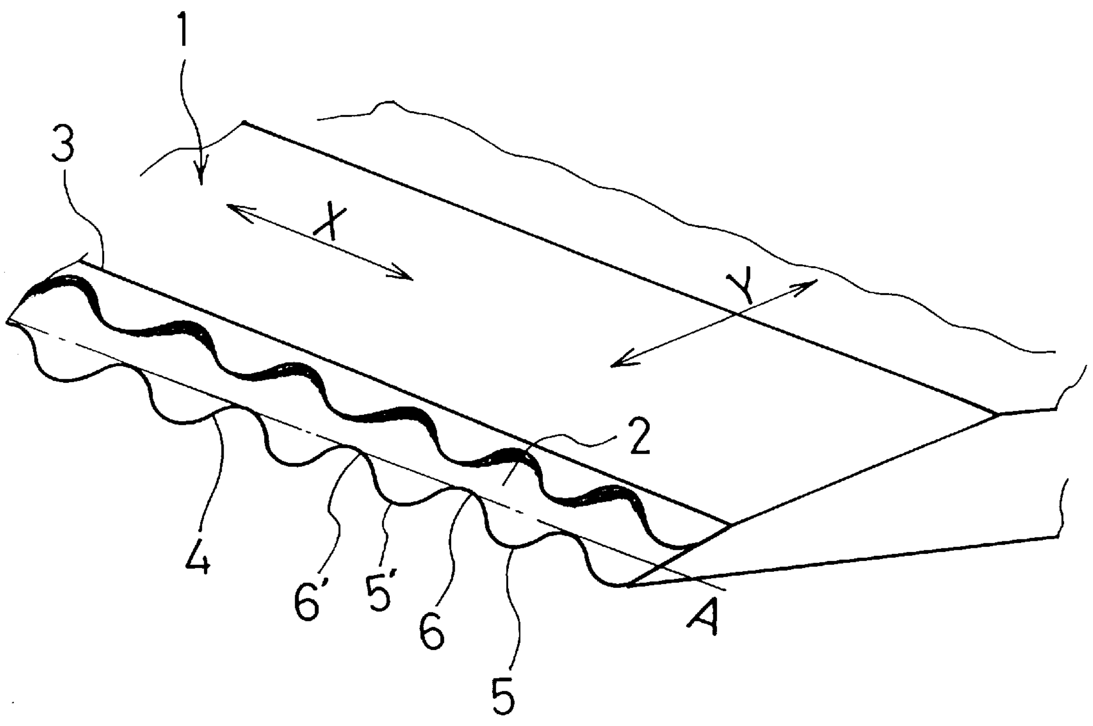
FIG. 6 is a perspective view showing the knife of the veneer peeling machine used for the production of the veneer in Example 4.

The veneer was produced by using a veneer peeling machine (slicer) equipped with the knife schematically shown in FIG. 6. The knife 1 has the blade 3 which is formed such that the wave-shaped face 2 runs continuously in the lengthwise direction (indicated by X) and the cutting edge 4 of the blade 3 deviates wavewise in the widthwise direction (indicated by Y).

The distance between adjacent crests (5 and 5') or adjacent troughs (6 and 6') is about 7 to 8 mm, and the height of the crest (or the distance between the crest 5 and the trough 6) is about 5 to 6 mm.

What is characteristic of this knife is that the wave-shaped face 2 runs continuously in the lengthwise direction (X) of the knife 1 and the troughs of the waves are disposed along the straight line (indicated by a chain line in FIG. 6) running in the lengthwise direction (X) of the knife.

The knife 1 used in this example is constructed such that the wave-shaped face 2 is a slope which is diagonally deviated by an angle ($\alpha$) with respect to the widthwise direction (Y) of the knife. The angle ($\alpha$) corresponds to the bias angle of the knife 1 or the locus swept by the diagonal movement of the knife 1. In other words, the wave shape at the cutting edge 4 (crest) is out of phase with the wave shape at the base (trough) by the angle ($\alpha$).

The knife for the half rotary is also constructed in the same manner as mentioned above (although not shown). That is, the wave-shaped face is a slope which is diagonally deviated by an angle ($\alpha$) corresponding to the bias angle.

Figure 7:
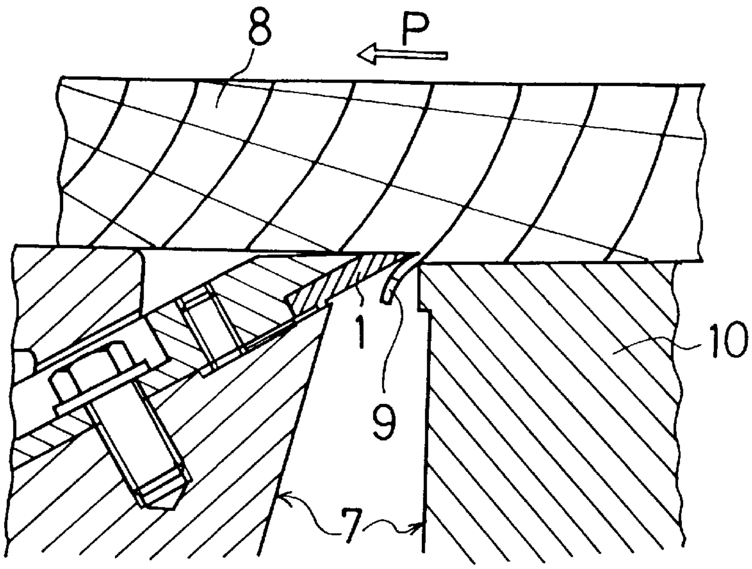
FIG. 7 is a schematic diagram showing the method of cutting the straight-grained veneer by using a slicer.

In this example, samples of veneer of desired thickness (with the straight grain) were prepared by using the above-mentioned two kinds of veneer peeling machine. The first veneer peeling machine is a slicer 7 shown in FIG. 7. It is designed such that the flitch 8 (which is pressed down against the nose bar 10) is moved horizontally in the direction of arrow P. The flitch is cut parallel to grain by the knife so that the cut surface assumes the straight grain. (In other words, the knife 1 is arranged such that its cutting direction makes an acute angle with the direction of the radial structure of the flitch 8.) The resulting veneer is 0.3 mm thick, for example.

Figure 8:
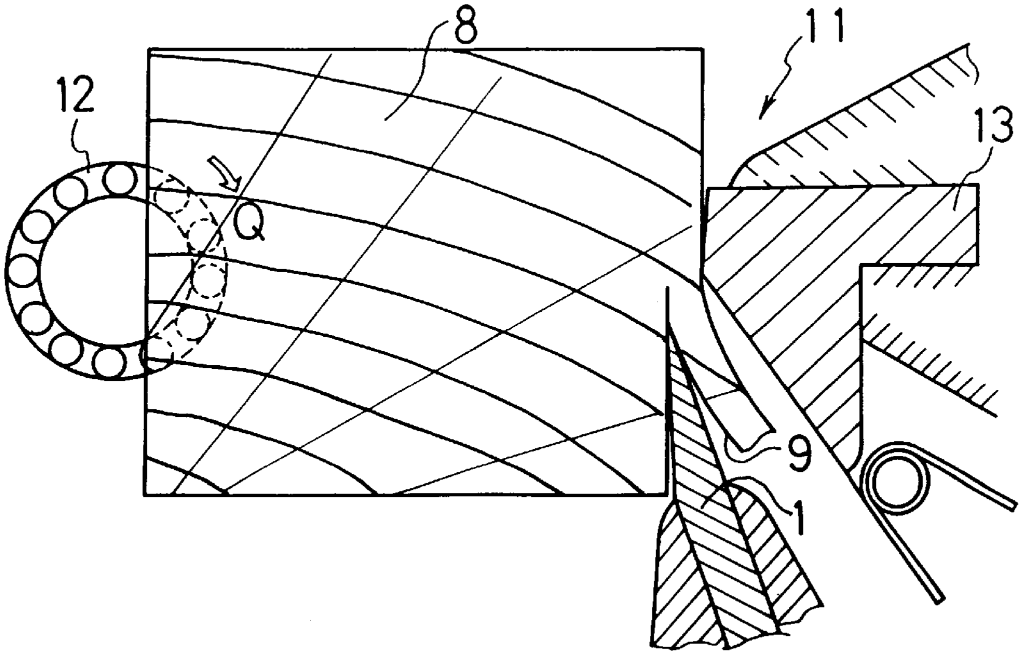
FIG. 8 is a schematic diagram showing the method of cutting the straight-grained veneer by using a half-rotary machine.

The second veneer peeling machine is a half rotary shown in FIG. 8. The flitch 8 (held by the chuck 12) is turned in the direction of arrow Q so that it is cut parallel to grain by the knife 1. The cut surface 9 assumes the straight grain. The resulting veneer is 0.3 mm thick, for example. Incidentally, the nose bar is indicated by 13.

The veneer obtained as mentioned above, which had uneven surfaces, was flattened by using three or four hot rolls at about 120° C., under a pressure of about 7 to 8 $kg/cm^2$ (for thermal fixing) or by using a hot press at about 130° C. for about 1 minute under a pressure of about 8 $kg/cm^2$ (for hot pressing).

Figure 2:
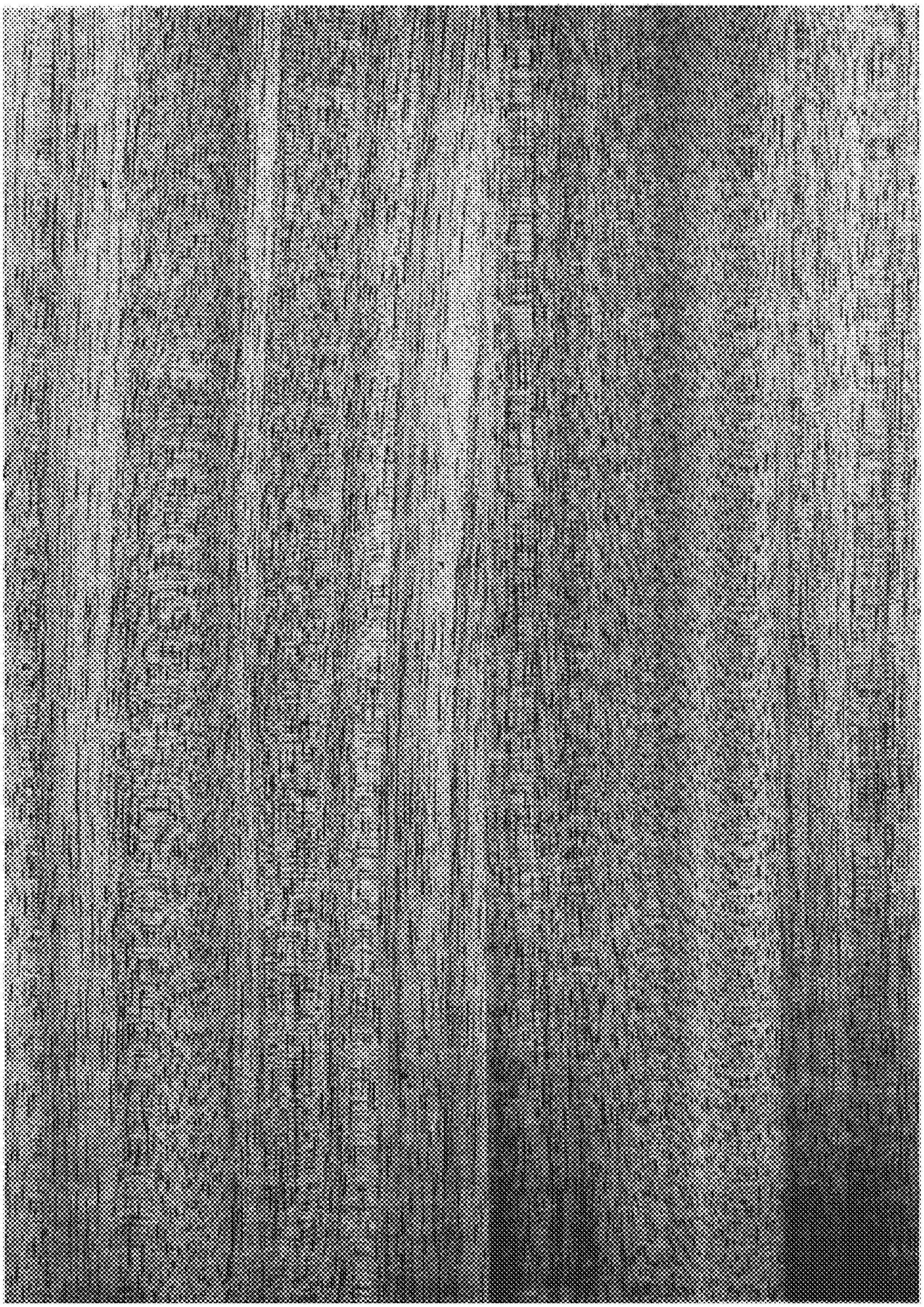
FIG. 2 is a actual-size photograph of the flitch used for the production of the cross-grained veneer shown in FIG. 1.
Figure 3:
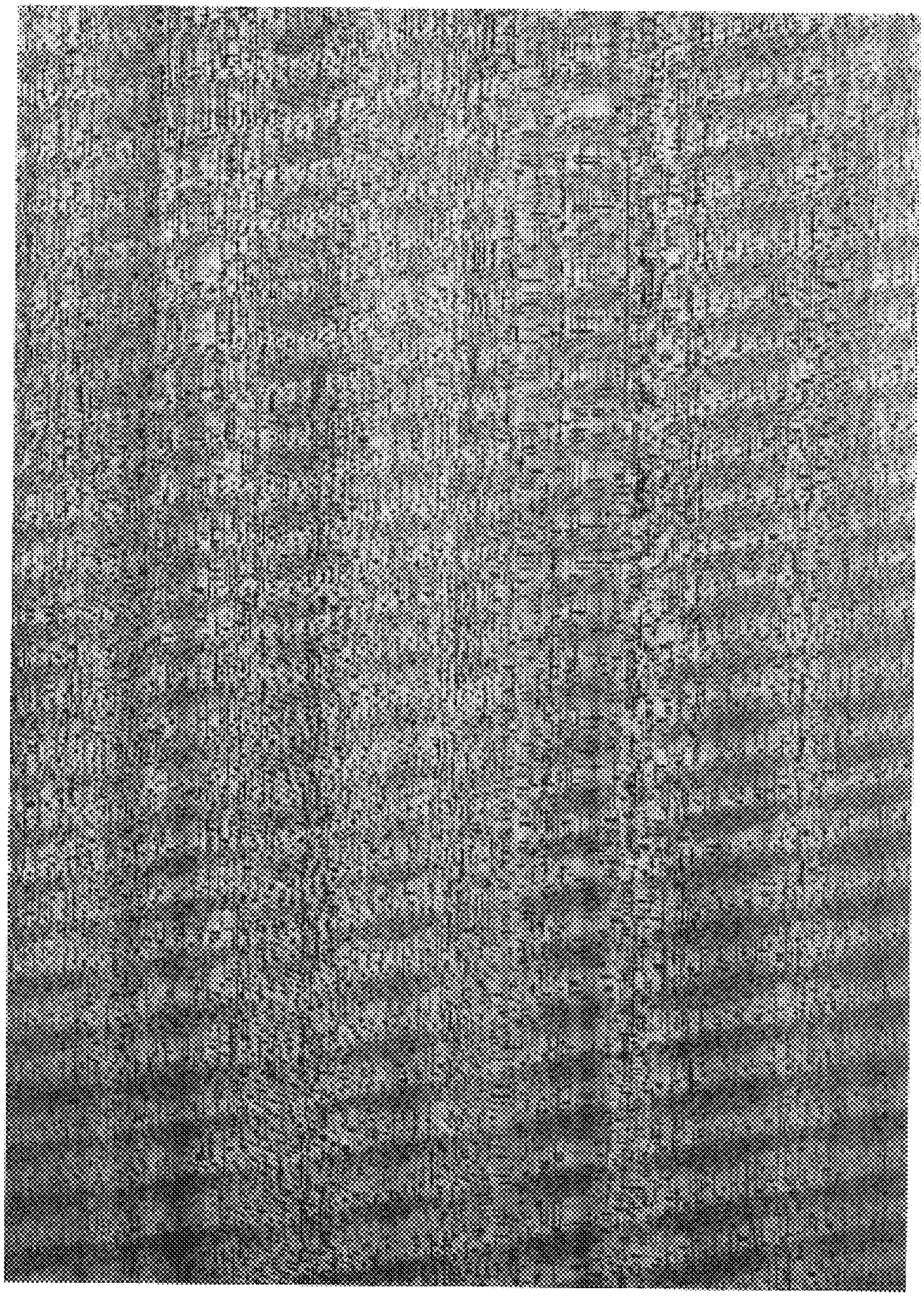
FIG. 3 is a actual-size photograph of the cross-grained veneer obtained in Example 2.
Figure 4:
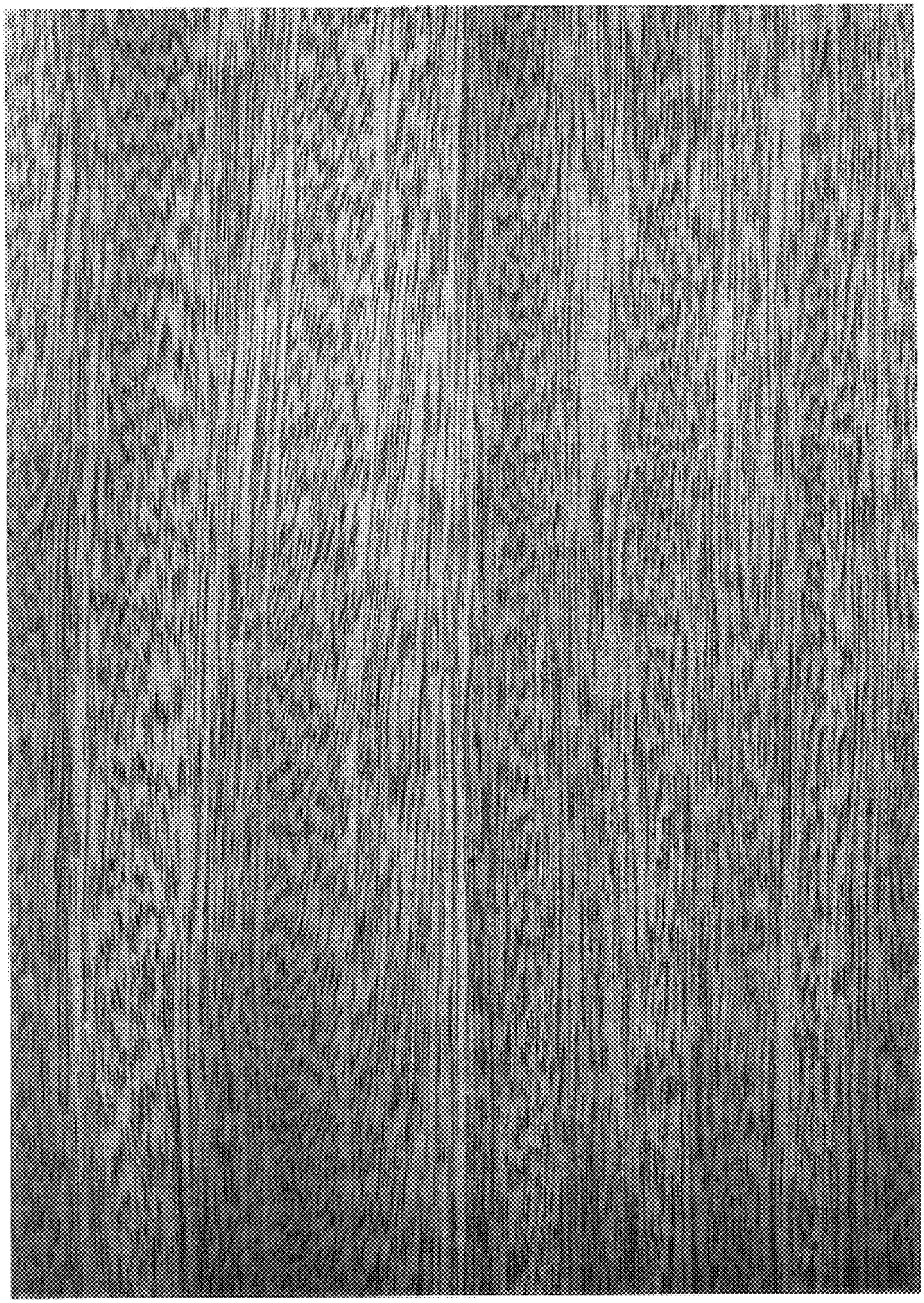
FIG. 4 is a actual-size photograph of the flitch used for the production of the cross-grained veneer shown in FIG. 3.
Figure 5:
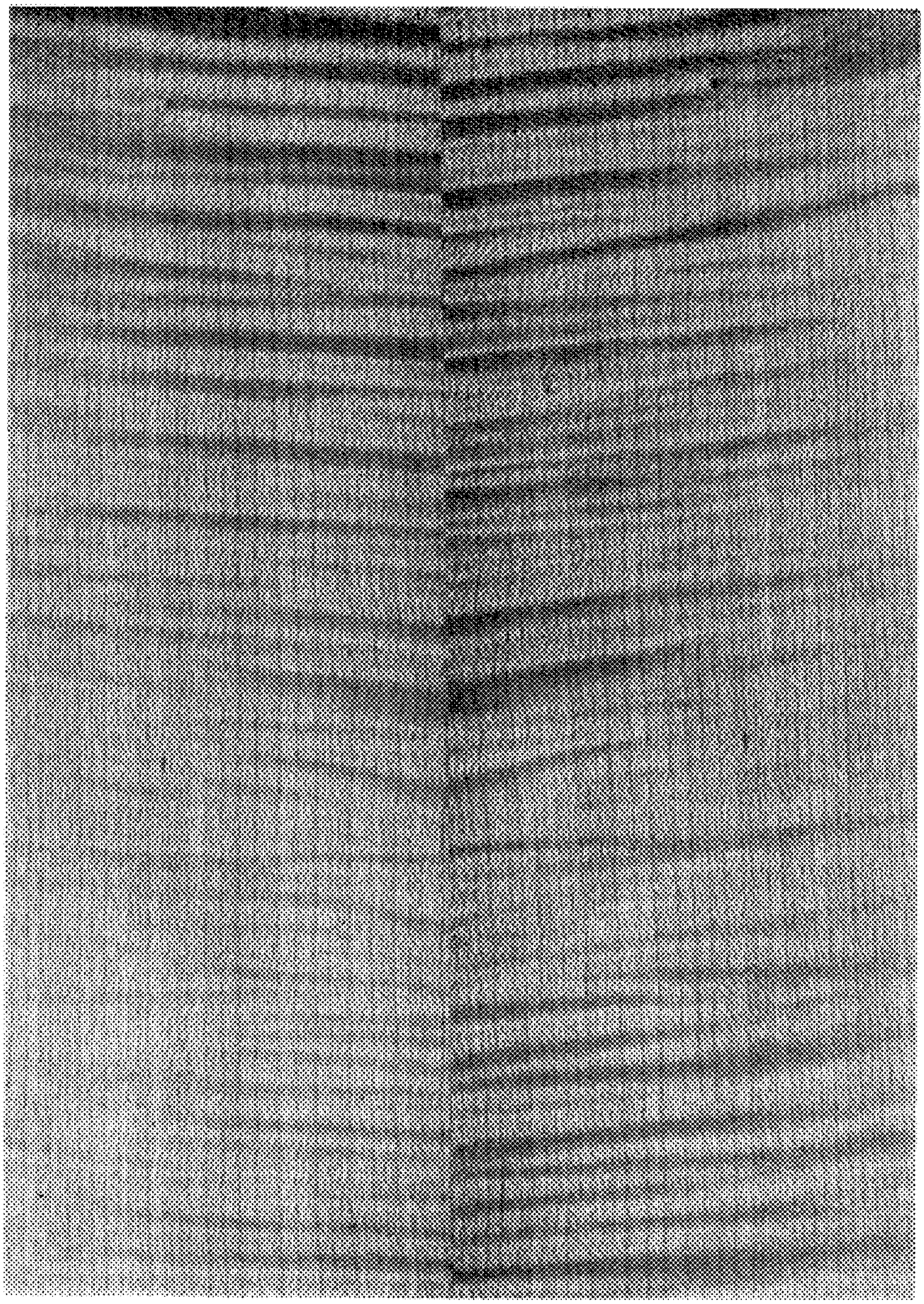
FIG. 5 is a actual-size photograph of the cross-grained veneer obtained in Example 3.

The resulting veneer assumed the wavy grain as shown in FIGS. 1 and 3 or the interlocked grain as shown in FIG. 5 although it was originally straight-grained veneer.

EXAMPLES 5 TO 8

These examples demonstrate, with reference to FIGS. 9 to 12, some knives suitable for artificially forming the cross grain on the surface of veneer.

The knives (1*a* to 1*d*) shown in FIGS. 9 to 12 are constructed such that the wave-shaped face 2 runs in the lengthwise direction (X) of the knife 1 and the troughs 6 of the wave are disposed along the straight line A extending in the lengthwise direction (X) of the knife 1. (The wave shape results from the cutting edge 4 of the blade 3 deviating wavewise with respect to the widthwise direction (Y) of the knife.)

Figure 9:
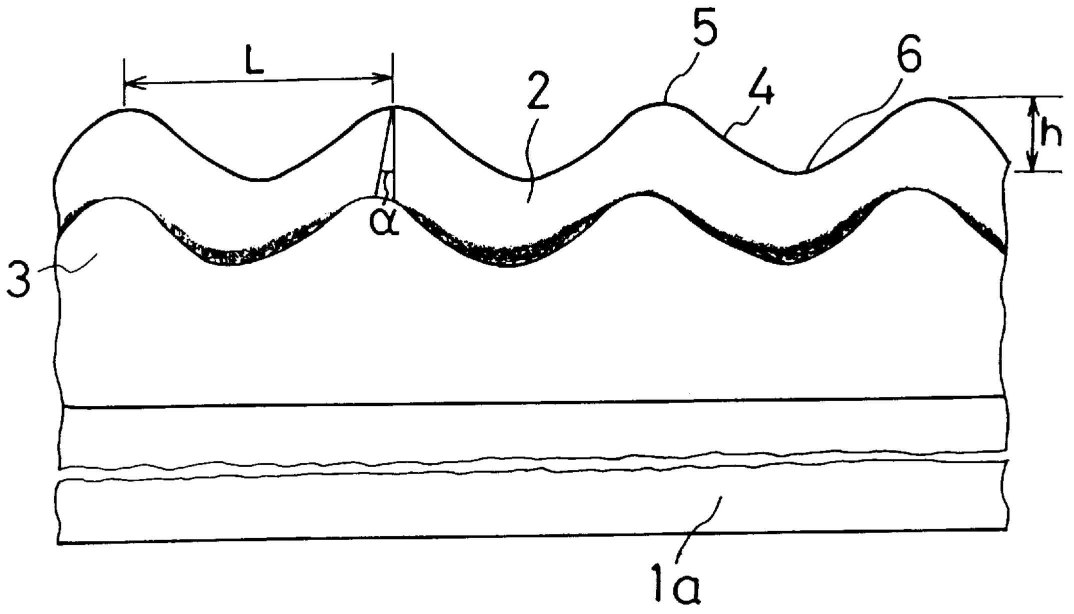
FIG. 9 is a partial front view of an example of the knife, with its cutting edge enlarged, mounted on the veneer peeling machine.

The knife 1*a* in Example 5 is shown in FIG. 9. It has the face 2 which is constructed such that both the distance (L) between the adjacent crests and the height (h) of the crest are uniform throughout the entire length of the blade 3. This knife la is suitable for artificially forming the wavy grain (termed "Gozachijimi" grain) on the surface of veneer.

Figure 10:
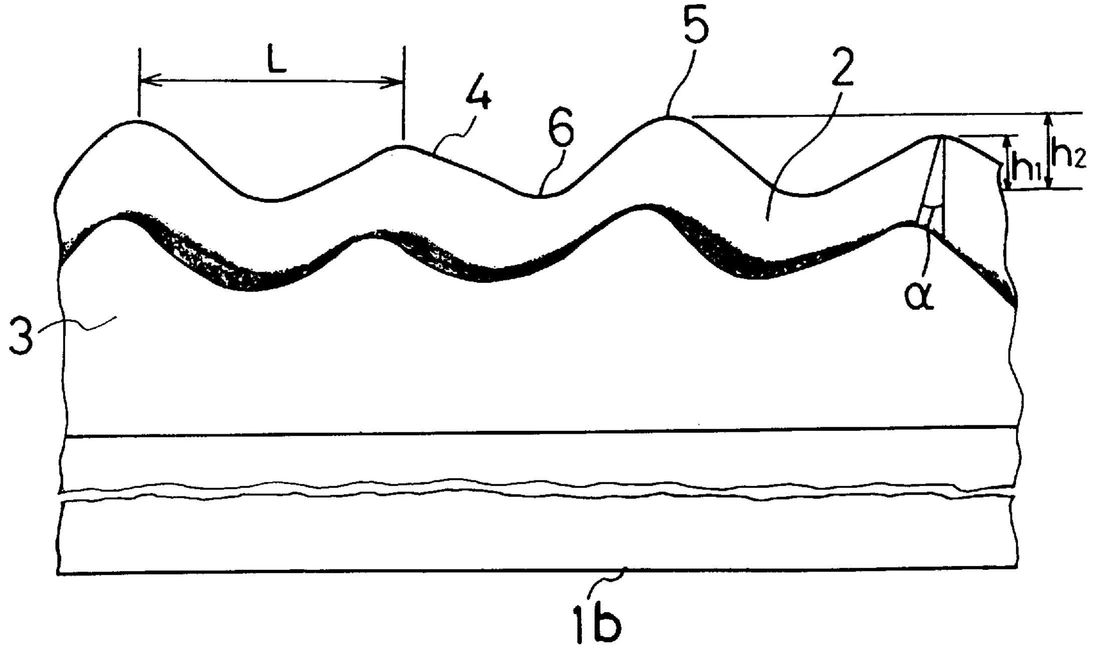
FIG. 10 is a partial front view of another example of the knife, with its cutting edge enlarged, mounted on the veneer peeling machine.

The knife 1*b* in Example 6 is shown in FIG. 10. It has the face 2 which is constructed such that the distance (L) between the adjacent crests is uniform throughout the entire length of the blade 3 but the height ($h_1$) of one crest differs from the height ($h_2$) of its adjacent crest. This knife 1*b* is also suitable for artificially forming the wavy grain (similar to that mentioned above) on the surface of veneer.

Figure 11:
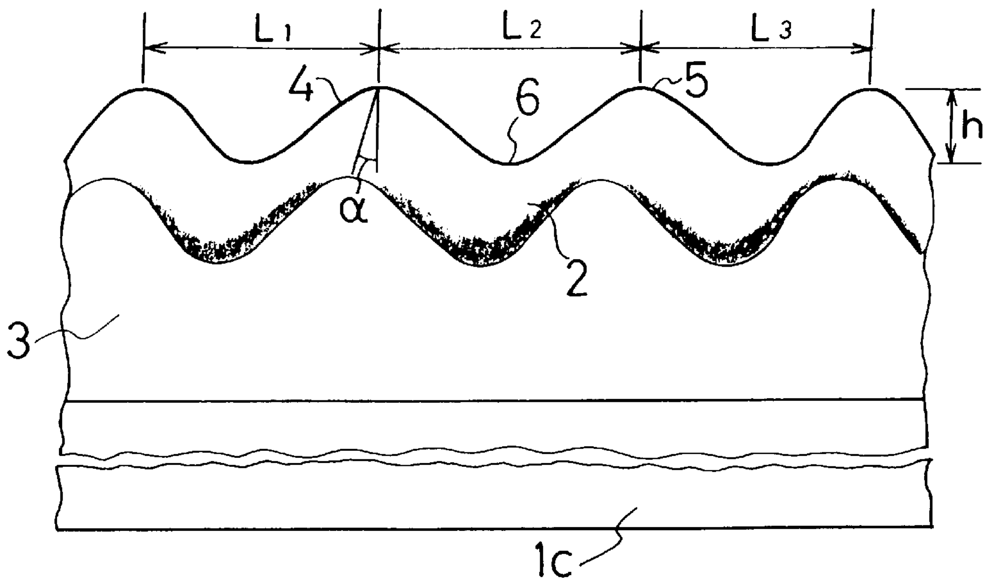
FIG. 11 is a partial front view of another example of the knife, with its cutting edge enlarged, mounted on the veneer peeling machine.

The knife 1*c* in Example 7 is shown in FIG. 11. It has the face 2 which is constructed such that the height (h) of the crest is uniform throughout the entire length of the blade 3 but the distances ($L_1$, $L_2$, $L_3$) between the adjacent crests differ from one another. This knife 1_c_ is suitable for artificially forming the interlocked grain (termed "Torachijimi" grain) on the surface of veneer.

Figure 12:
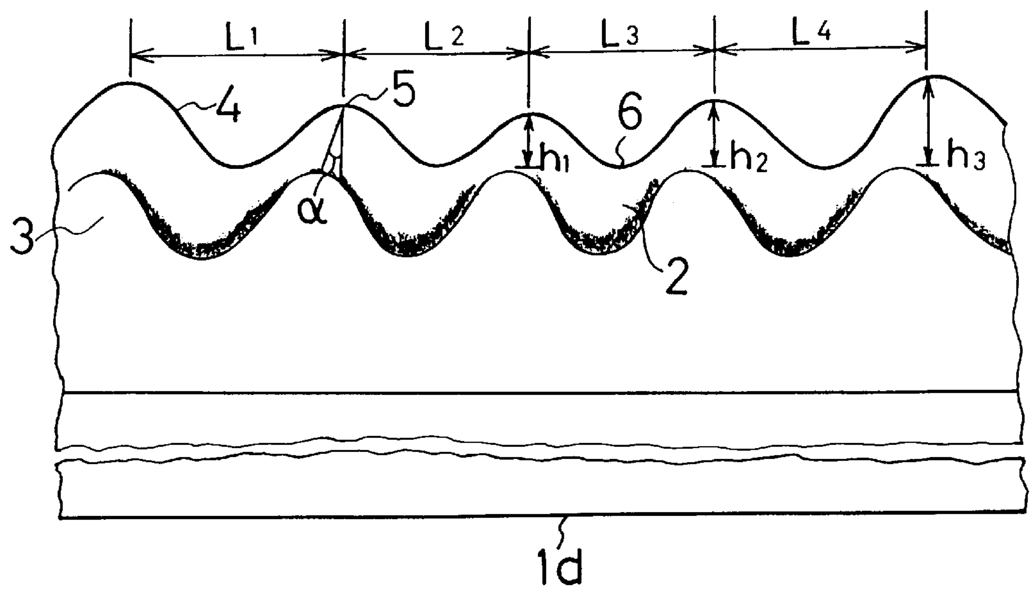
FIG. 12 is a partial front view of another example of the knife, with its cutting edge enlarged, mounted on the veneer peeling machine.

The knife 1_d_ in Example 8 is shown in FIG. 12. It has the face 2 which is constructed such that both the distances ($L_1$, $L_2$, $L_3$, $L_4$) between the adjacent crests and the heights ($h_1$, $h_2$) of the crests are not uniform. This knife 1_d_ is suitable for artificially forming the interlocked grain (termed "Torachijimi" grain) on the surface of veneer.

It should be noted that these knives 1_a_ to 1_d_ have the inclined face which is deviated by the angle a (say 15°) which corresponds to the bias angle of the knife or the locus swept by the movement of the knife or which is deviated along the curved local swept by the movement of the knife.

Samples of veneer were cut parallel to grain by using the veneer peeling machine (slicer or half rotary) equipped with one of the above-mentioned four knives 1_a_ to 1_d_ in the same manner as in Example 4. The resulting samples assumed the cross grain (such as wavy grain and interlocked grain varying from one sample to another) on the surface of straight-grained veneer.

[Effect of the Invention]

The present invention provides various kinds of veneer having the cross grain (such as spiral grain, interlocked grain, and wavy grain) which is artificially formed on the surface of straight-grained veneer.

According to the production method of the present invention, it is possible to produce flat veneer which assumes the artificially formed cross grain on the surface of straight-grained veneer, from the wood which should give the cross grain but in actual does not give the cross grain.

The knife used in the present invention makes it possible to artificially form the cross grain (such as spiral grain, interlocked grain, and wavy grain) on the straight-grained veneer at the same time wood is cut to give straight-grained veneer.

What is claimed is:

1. A cross-grained veneer consisting of an originally straight-grained wood veneer having an artificially cut cross grain on the surface thereof produced by cutting wood into veneer that assumes a straight grain, with a knife whose wave-shaped face runs continuously in a lengthwise direction, said face being inclined and deviated by an angle that corresponds to the bias angle of the knife or the locus swept by the movement of the knife, and by flattening the veneer having an uneven surface, wherein the cross grain is selected from the group consisting of wavy grain and interlocked grain, and wherein the cutting edge of the knife waves in a widthwise direction of the knife and troughs of the waves are disposed along a straight line extending in the lengthwise direction of the knife.

2. The veneer as defined in claim 1, wherein the cross grain is wavy grain.

3. The veneer as defined in claim 2, wherein the straight-grained veneer is veneer of natural wood or veneer of artificial grain.

4. The veneer as defined in claim 1, wherein the straight-grained veneer is veneer of natural wood or veneer of artificial grain.

5. A veneer sheet which comprises the cross-grained veneer defined in claim 1 and a backing material bonded thereto, said backing material being a fibrous sheet or plastics film.

6. The veneer sheet as defined in claim 5, wherein said fibrous sheet is a nonwoven fabric or a resin-impregnated paper.

7. The veneer sheet as defined in claim 5, wherein the fibrous sheet is a nonwoven fabric.

8. The veneer sheet as defined in claim 5, wherein the plastics film is a polyethylene film.

9. The veneer according to claim 1, wherein the cross grain is interlocked grain.

* * * * *